US008341185B2

(12) United States Patent
Sathish

(10) Patent No.: US 8,341,185 B2
(45) Date of Patent: Dec. 25, 2012

(54) METHOD AND APPARATUS FOR CONTEXT-INDEXED NETWORK RESOURCES

(75) Inventor: Sailesh Kumar Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 293 days.

(21) Appl. No.: 12/753,518

(22) Filed: Apr. 2, 2010

(65) Prior Publication Data

US 2011/0246438 A1    Oct. 6, 2011

(51) Int. Cl.
G06F 17/30    (2006.01)
(52) U.S. Cl. ......... 707/791; 707/802; 707/822; 707/828
(58) Field of Classification Search ........... 707/600–899
See application file for complete search history.

(56) References Cited

U.S. PATENT DOCUMENTS

| 7,219,073 | B1 | 5/2007 | Taylor et al. |
| 7,873,994 | B1* | 1/2011 | Wu ................................ 726/14 |
| 2004/0068502 | A1 | 4/2004 | Vogedes et al. |
| 2007/0050191 | A1 | 3/2007 | Weider et al. |
| 2007/0198505 | A1 | 8/2007 | Fuller |
| 2007/0255735 | A1 | 11/2007 | Taylor et al. |
| 2008/0005079 | A1 | 1/2008 | Flake et al. |
| 2008/0016050 | A1 | 1/2008 | Stensmo |
| 2008/0082490 | A1 | 4/2008 | MacLaurin et al. |
| 2008/0288454 | A1 | 11/2008 | Swadi |
| 2010/0017366 | A1 | 1/2010 | Robertson et al. |
| 2010/0042910 | A1 | 2/2010 | Manolescu et al. |
| 2010/0057728 | A1 | 3/2010 | Quick et al. |

FOREIGN PATENT DOCUMENTS

| EP | 1 843 257 A1 | 10/2007 |
| JP | 2010-191688 A | 9/2010 |
| WO | WO 01/09771 A1 | 2/2001 |
| WO | WO 02/099597 A2 | 12/2002 |

OTHER PUBLICATIONS

International Search Report for corresponding PCT Application No. PCT/FI2011/050253, Jun. 27, 2011, pp. 1-7.
Written Opinion for corresponding PCT Application No. PCT/FI2011/050253, Jun. 27, 2011, pp. 1-8.

* cited by examiner

*Primary Examiner* — Isaac M Woo
(74) *Attorney, Agent, or Firm* — Ditthavong Mori & Steiner, P.C.

(57) ABSTRACT

Techniques to provide context-indexed network resources include determining a network resource that is associated with first data in response to receiving first data that describes a context feature. A context token is determined, which indicates a probability, in the first data, of a topic from a context vocabulary. The context vocabulary includes concepts describing temporal, spatial, environmental or activity circumstances of consumers. Second data is stored, which indicates the network resource in association with the context token. In some embodiments, determining a network resource associated with the first data includes sending a topic based on the feature context token to a network resource search engine; and, the network resource is determined based on data returned from the network resource search engine.

7 Claims, 10 Drawing Sheets

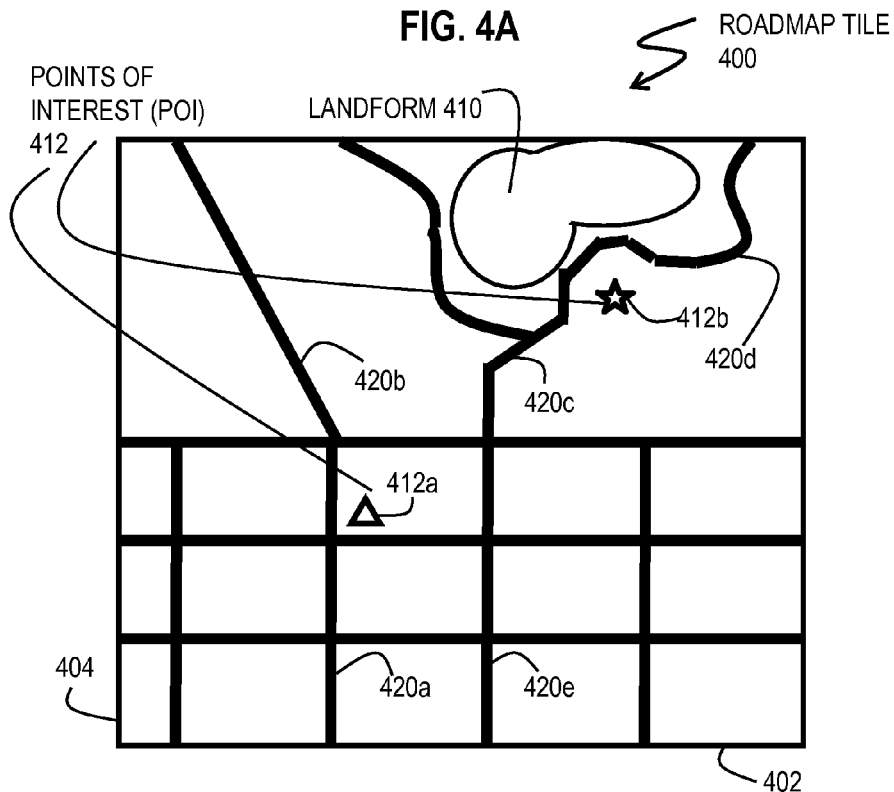
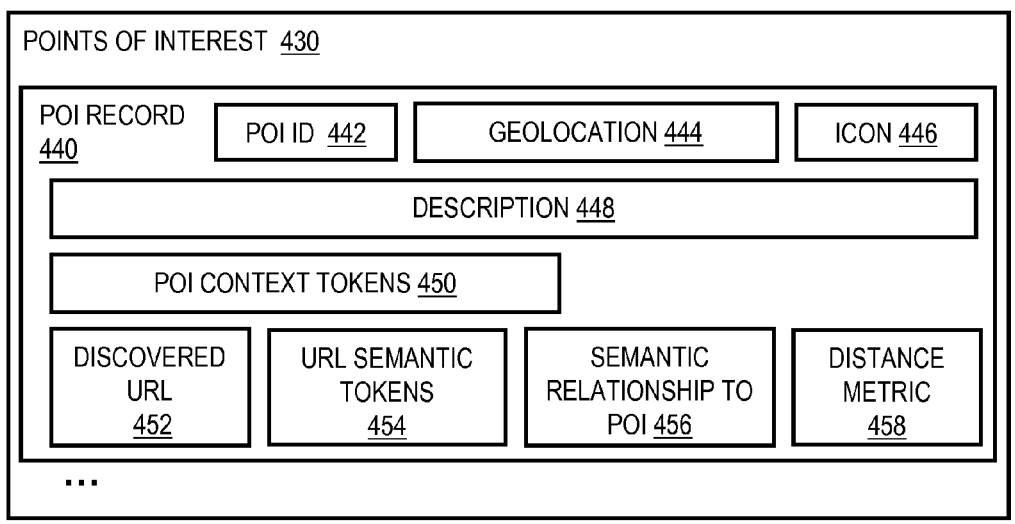

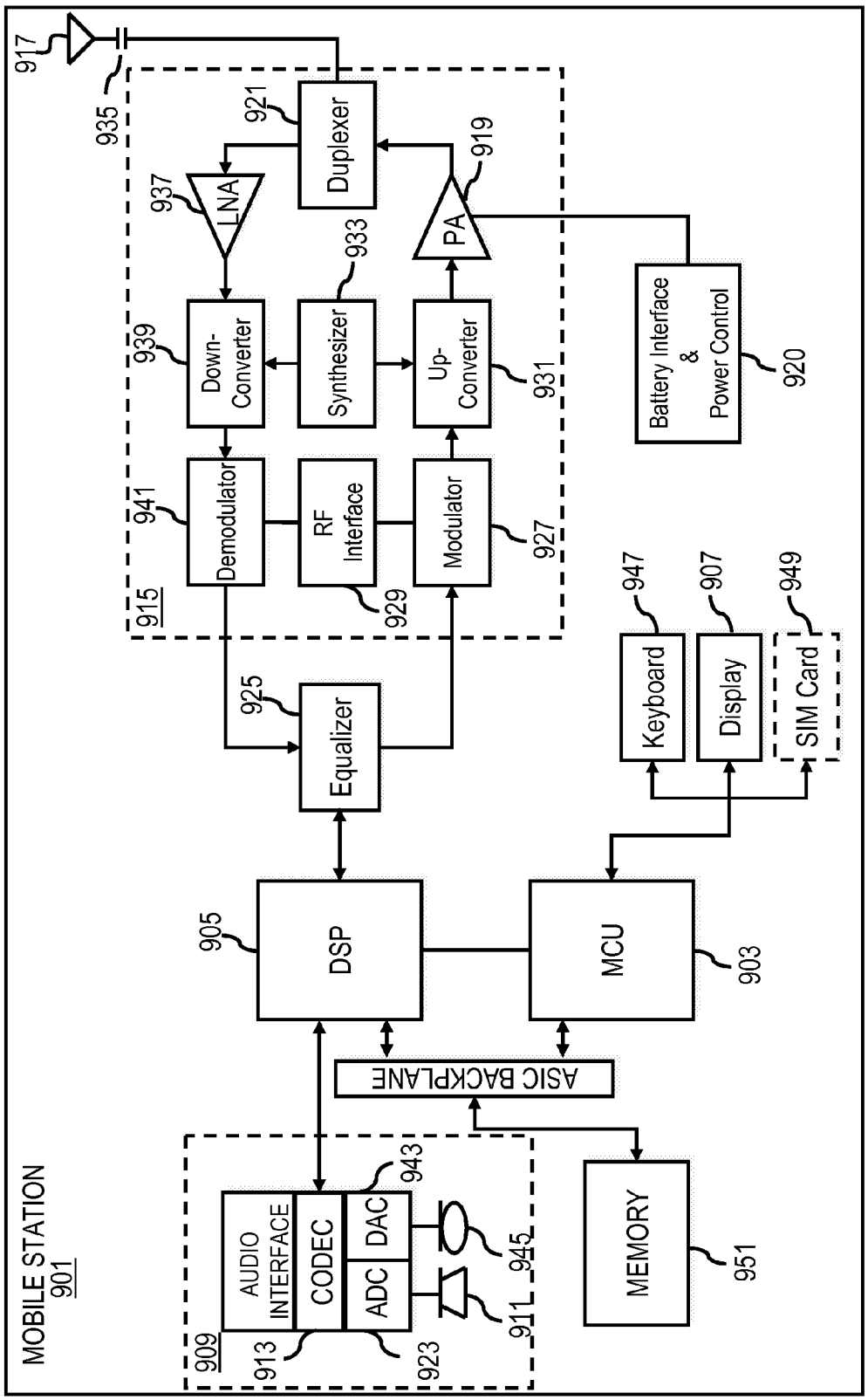

METHOD AND APPARATUS FOR CONTEXT-INDEXED NETWORK RESOURCES

BACKGROUND

Service providers and device manufacturers (e.g., wireless, cellular, etc.) are continually challenged to deliver value and convenience to consumers by, for example, providing compelling network services. One service of interest is to provide consumers with links to relevant network resources, such as home pages of a restaurant or bank or bus depot. However, relevance of network resources can change substantially based on the consumer's circumstances, such as whether the consumer is working for pay or performing other duties or at leisure, whether the current time is a weeknight or weekend, whether the current season is summer or winter, and whether the consumer is at home or away. Internet search engines require user input of one or more keywords to determine what network resources are relevant, but do not automatically determine what is relevant based on the consumer's current circumstances.

SOME EXAMPLE EMBODIMENTS

Therefore, there is a need for an approach for determining automatically what network resources are relevant based on the current circumstances of a consumer. To support such an automatic determination, a repository of context-indexed network resource links is provided.

According to one embodiment, a method comprises facilitating access, including granting access rights, to an interface to allow access to a service via a network. The service is configured to determine a network resource that is associated with first data in response to receiving first data that describes a context feature. The service is further configured to determine a context token that indicates a probability, in the first data, of a topic from a context vocabulary. The context vocabulary includes concepts describing temporal, spatial, environmental or activity circumstances of consumers The service is further configured to cause, at least in part, actions that result in storing second data that indicates the network resource in association with the context token.

According to another embodiment, a method includes determining local context data that indicates one or more of temporal, spatial, environmental or activity circumstances of a consumer of network services. The method further comprises causing, at least in part, actions that result in sending the local context data to a service via a network. The method further comprises determining whether data that indicates a network resource is received in response to sending the local context data. The method further comprises causing, at least in part, actions that result in presenting data that indicates the network resource to the consumer, if data that indicates the network resource is received.

According to another embodiment, an apparatus comprises at least one processor, and at least one memory including computer program code. The at least one memory and the computer program code are configured to, with the at least one processor, cause, at least in part, the apparatus to determine a network resource that is associated with first data in response to receiving first data that describes a context feature. The apparatus is also caused to determine a context token that indicates a probability, in the first data, of a topic from a context vocabulary. The context vocabulary includes concepts describing temporal, spatial, environmental or activity circumstances of consumers. The apparatus is further caused to perform, at least in part, actions that result in storing second data that indicates the network resource in association with the context token.

According to another embodiment, an apparatus comprises at least one processor, and at least one memory including computer program code. The at least one memory and the computer program code are configured to, with the at least one processor, cause, at least in part, the apparatus to determine local context data that indicates one or more of temporal, spatial, environmental or activity circumstances of a consumer who uses the apparatus to obtain network services. The apparatus is further caused to perform, at least in part, actions that result in sending the local context data to a service via a network. The apparatus is further caused, at least in part, to determine whether data that indicates a network resource is received in response to sending the local context data. The apparatus is further caused, at least in part, to perform actions that result in presenting data that indicates the network resource on a display of the apparatus, if data that indicates the network resource is received.

According to another embodiment, a computer-readable storage medium carries one or more sequences of one or more instructions which, when executed by one or more processors, cause, at least in part, an apparatus to determine a network resource that is associated with the data in response to receiving first data that describes a context feature. The apparatus is also caused to determine a context token that indicates a probability, in the first data, of a topic from a context vocabulary. The context vocabulary includes concepts describing temporal, spatial, environmental or activity circumstances of consumers. The apparatus is further caused to perform, at least in part, actions that result in storing second data that indicates the network resource in association with the context token.

According to another embodiment, a computer program product comprises one or more sequences of one or more instructions which, when executed by one or more processors, cause, at least in part, an apparatus to determine a network resource that is associated with the data in response to receiving first data that describes a context feature. The apparatus is also caused to determine a context token that indicates a probability, in the first data, of a topic from a context vocabulary. The context vocabulary includes concepts describing temporal, spatial, environmental or activity circumstances of consumers. The apparatus is further caused to perform, at least in part, actions that result in storing second data that indicates the network resource in association with the context token.

According to another embodiment, a computer-readable storage medium carries one or more sequences of one or more instructions which, when executed by one or more processors, cause, at least in part, an apparatus to determine local context data that indicates one or more of temporal, spatial, environmental or activity circumstances of a consumer who uses the apparatus to obtain network services. The apparatus is further caused to perform, at least in part, actions that result in sending the local context data to a service via a network. The apparatus is further caused, at least in part, to determine whether data that indicates a network resource is received in response to sending the local context data. The apparatus is further caused, at least in part, to perform actions that result in presenting data that indicates the network resource on a display of the apparatus, if data that indicates the network resource is received.

According to another embodiment, a computer program product comprises one or more sequences of one or more instructions which, when executed by one or more processors, cause, at least in part, an apparatus to to determine local context data that indicates one or more of temporal, spatial, environmental or activity circumstances of a consumer who uses the apparatus to obtain network services. The apparatus is further caused to perform, at least in part, actions that result in sending the local context data to a service via a network. The apparatus is further caused, at least in part, to determine whether data that indicates a network resource is received in response to sending the local context data. The apparatus is further caused, at least in part, to perform actions that result in presenting data that indicates the network resource on a display of the apparatus, if data that indicates the network resource is received.

According to another embodiment, an apparatus comprises means for determining a network resource that is associated with first data, in response to receiving first data that describes a context feature. The apparatus also comprises means for determining a context token that indicates a probability, in the first data, of a topic from a context vocabulary. The context vocabulary includes concepts describing temporal, spatial, environmental or activity circumstances of consumers. The apparatus further comprises means for storing second data that indicates the network resource in association with the context token.

According to another embodiment, an apparatus comprises means for determining local context data that indicates one or more of temporal, spatial, environmental or activity circumstances of a consumer who uses the apparatus to obtain network services. The apparatus further comprises means for sending the local context data to a service via a network. The apparatus further comprises means for determining whether data that indicates a network resource is received in response to sending the local context data. The apparatus further comprises means for presenting data that indicates the network resource on a display of the apparatus, if data that indicates the network resource is received.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4A is a diagram of a roadmap tile with points of interest, according to an embodiment;

FIG. 4B is a diagram of a points of interest data structure with context-indexed URL information, according to an embodiment;

FIG. 9 is a diagram of a mobile terminal (e.g., handset) that can be used to implement an embodiment of the invention.

DESCRIPTION OF SOME EMBODIMENTS

Figure 1:
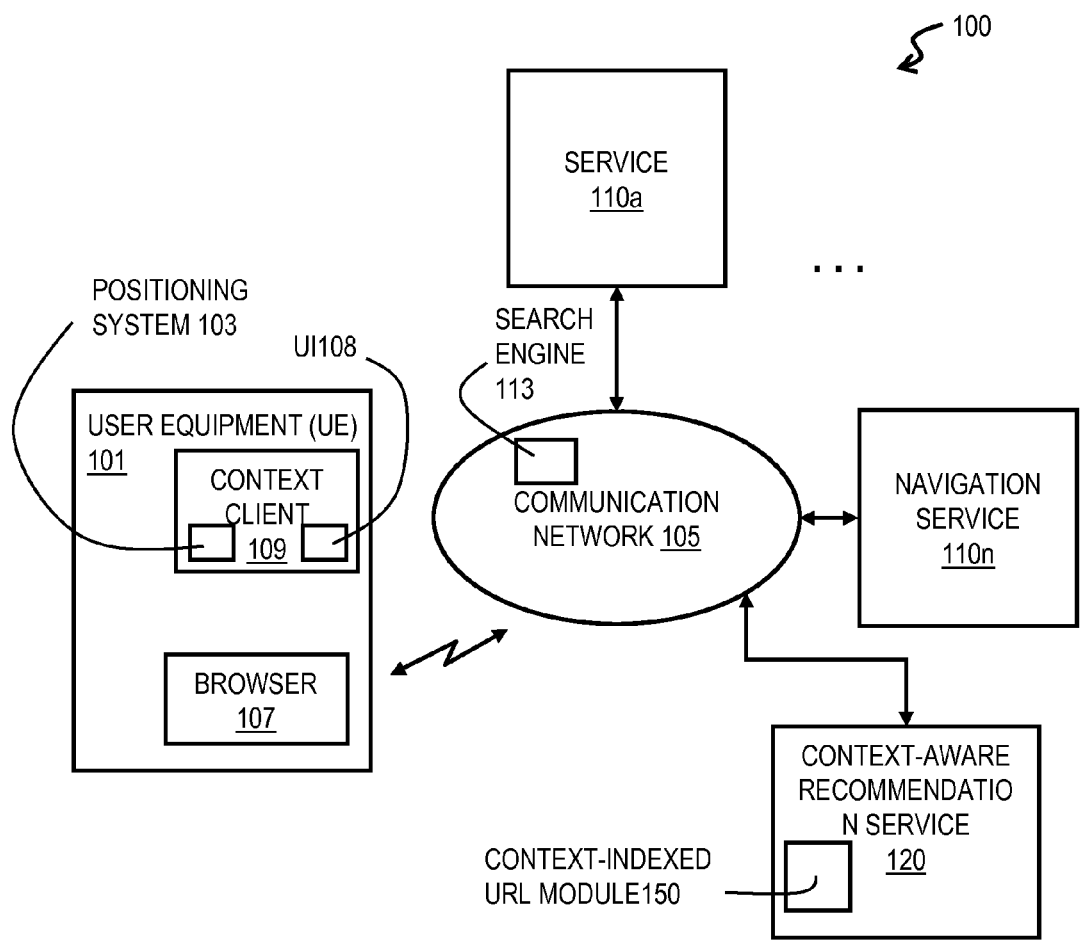
FIG. 1 is a diagram of a system capable of providing context-indexed network resources, according to one embodiment.

Examples of a method, apparatus, and computer program are disclosed for providing context-indexed network resources. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term context refers to temporal, spatial, environmental or activity circumstances of one or more consumers of network services, or some combination. Example context for a particular consumer of network services includes doing on-line bill payments at home on a weeknight while listening to classical music and exchanging texts with three friends. Other example context information includes environment data such as nearby devices, temperature, pressure, humidity, ambient sound, ambient light, velocity, acceleration, or some combination. A network resource is a web page, web service, file or database for which access is granted via a communications network. A network resource is indicated by a network address, such as a uniform resource locator (URL), well known in the art. Some network resources are network services that perform one or more functions, such as social networking or sending and receiving electronic mail, as a result of a message received over a network from a consumer. Although various embodiments are described with respect to a consumer who is a user of a mobile telephone and network resources indicated by URLs, it is contemplated that the approach described herein may be used with other devices, such as desktop or laptop computers, and other indicators of network resources, such as a Internet Protocol (IP) address and Transmission Control Protocol (TCP) port number.

As used herein, context is different from content. As state above, context refers to circumstances surrounding a consumer. Content refers to what is provided by a network resource; and includes, for example, digital sound, songs, digital images, digital games, digital maps, point of interest information, digital videos, such as music videos, news clips and theatrical videos, advertisements, electronic books, presentations, digital documents, text files, program files or objects, any other digital media, or any combination thereof.

In various embodiments, a context vocabulary and topology is developed that identifies words and topics related to consumers' circumstances (context). Any method known in the art may be used to generate the context vocabulary and topology. For example, several documents are collected that discuss and describe consumer context, such as documents that describe the significance of whether the consumer is working for pay or performing other duties or at leisure, whether the current time is a weeknight or weekend, whether the current season is summer or winter, whether the consumer is at home or away, or whether the consumer is at a destination or en route, whether the consumer is stationary or moving and at what speeds and directions, and what applications are available on user equipment belonging to the consumer. These documents are mined to determine words related to consumer context, collections of words related to context, or relative usage of those words, or some combination. In some embodiments, the vocabulary topology includes topics imposed on or deduced from relative occurrences of words within the documents. For example, in various embodiments, probabilistic latent semantic indexing (pLSI) or Latent Dirichlet allocation (LDA), well known in the art, is used to deduce topics from words in a set of documents. Such methods can be used to derive context words and context topics from a set of documents that are directed to the circumstances of consumers of network services. Because each topic is associated with a group of words in certain relative abundances, there is a topology relating topics to words and sub-topics to higher level topics. The context vocabulary topology is used in various embodiments described herein to index network resources by context. In addition a semantic vocabulary of general content is also used. The term semantic vocabulary to describe the general content vocabulary and the context vocabulary to describe the situational characteristic surrounding a user.

FIG. 1 is a diagram of a system capable of providing context-indexed network resources, according to one embodiment. Internet search engines require user input of one or more keywords to determine what network resources are relevant, but do not automatically determine what is relevant based on the consumer's current circumstances. Furthermore, the search engine indexes do not emphasize words and topics related to consumer context, but instead emphasize the semantic topics discovered within the network resources themselves. However, to re-index all network resources with the context vocabulary is very expensive in terms of computational resources on the equipment available to most network service providers and sufficiently time consuming to prevent completion before delays perceived by a consumer become unacceptable.

To address this problem, a system 100 of FIG. 1 introduces the capability to provide and use context-indexed URLs for network resources focused on consumers of a network service for providing context-aware recommendations of network resources. As shown in FIG. 1, the system 100 comprises user equipment (UE) 101 having connectivity to network services 110a through 110n (collectively called network services 110), an internet search engine 113, and context-aware recommendation service 120 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistant (PDA), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, network services 110 and context-aware recommendation service 120 communicate with each other and other components of the communication network 105 using well known, new or still developing protocols. As used herein, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web (WWW) servers that provide web pages. For example, internet search engine 113 communicates with the browser 107 using HTTP messages.

In the illustrated embodiment, the context-aware recommendation service 120 includes a context-indexed URL module 150 that determines URLs of network resources of potential relevance to context of consumers who subscribes to the service 120, e.g., by querying network services 110 to which the consumers also subscribe or which the consumers have used historically or which are pre-determined by the context-aware recommendation service. In the illustrated embodiment, the network services 110 include a navigation service 110n. The potentially relevant URLs are stored in association with topics from a context vocabulary topology. The associated context topics are stored with semantic topics discovered in the network resources associated with those URLs. Thus, not all URLs for resources connected to network 105 need be indexed with topics from the context vocabulary, only those related to network services that relate to the context of the consumers of service. By connecting the context-aware recommendation service 120 to the network 105, the service 120 facilitates access, including granting access rights, to an interface to allow access to the service 120 and module 150 via the network 105.

The UE 101 includes a browser 107 for communicating with one or more of network services 110. The UE 101 also includes a context client 109 for communicating with a context-aware recommendation service 120. In some embodiments, the browser 107 performs one or more functions of the context client 109. The context client 109 determines the local context of a consumer who uses UE 101, such as local time, geographic position from positioning system 103, local environmental conditions (such as ambient temperature, pressure, light and sound), applications currently executing on UE 101, content currently being rendered on UE 101, and user input through a user interface (UI) module 108. The context information is sent via network 105 to the context-aware recommendation service 120. At the context-aware recommendation service 120, a match is made between the current context of the consumer and the context-indexed URLs maintained by the module 150. One or more URLs relevant to the consumer's current context are sent to the context client 109 as recommendations. The recommended URLs are presented to the consumer, e.g., in browser 107 or UI module 108. When a recommended URL is selected by the consumer at UE 101, the URL is accessed, e.g., by launching the browser 107 to send an HTTP request to the network resource indicated by the URL.

The positioning system is any positioning system known in the art, such as the global positioning system (GPS). The UI module 108 includes one or more icons of picture elements to be presented on a display of the UE, or sounds to play through a speaker, and instructions to detect user input, as typed keys or touches on a touch screen or some other operation of an input device on UE 101, such as words spoken into a microphone.

Figure 3:
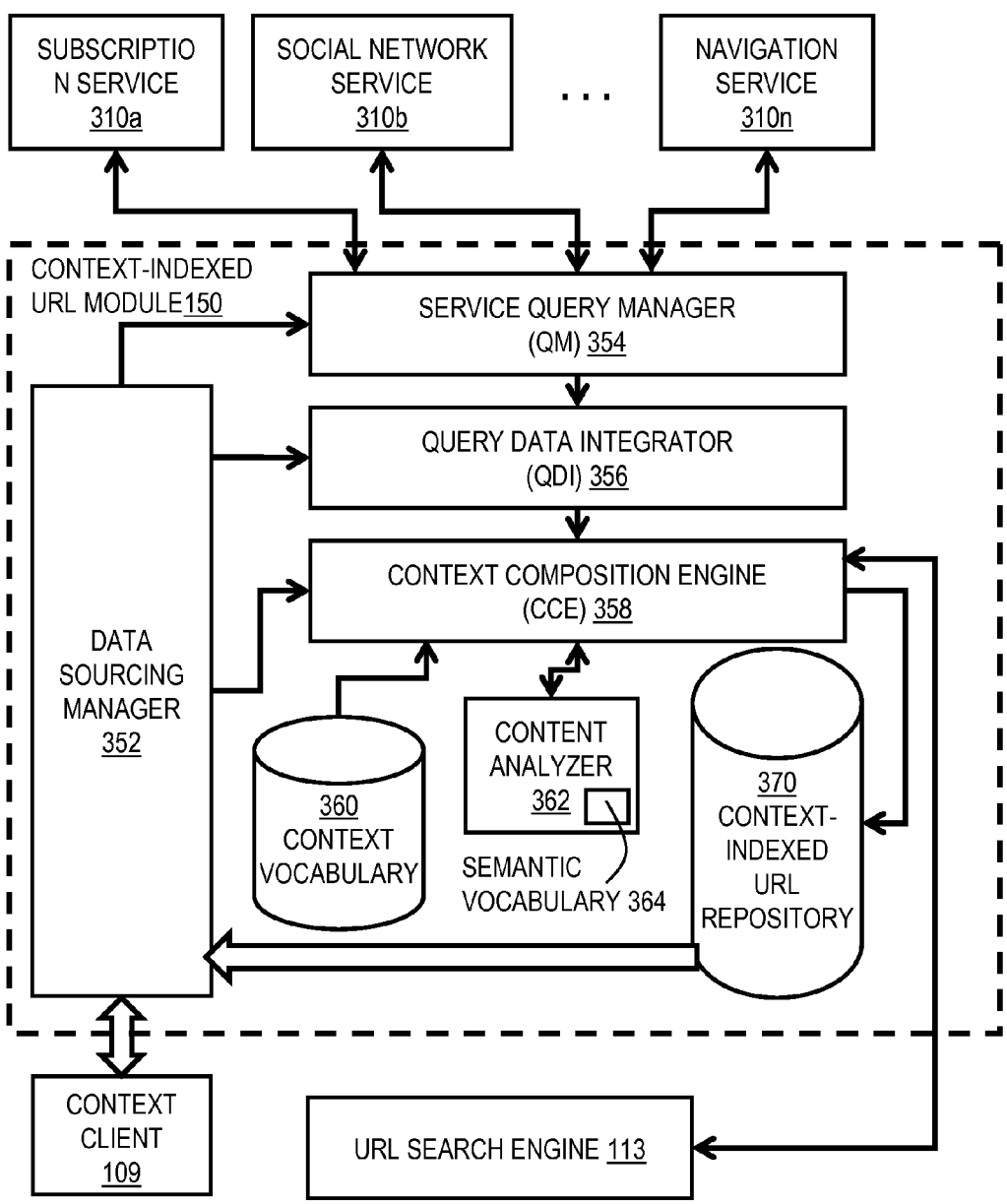
FIG. 3 is a diagram of the components of a context-indexed universal resource locator (URL) module, according to one embodiment.

Although processes, modules and data structures are shown in FIG. 1, and subsequent diagram FIG. 3, as integral blocks arranged in a particular order on particular equipment for purposes of illustration, in other embodiments one or more processes, modules or data structures, or portions thereof are arranged in a different order on the same or different equipment in communication with network 105. For example, in some embodiments, UI module 108 is external to context client module 109.

Figure 2:
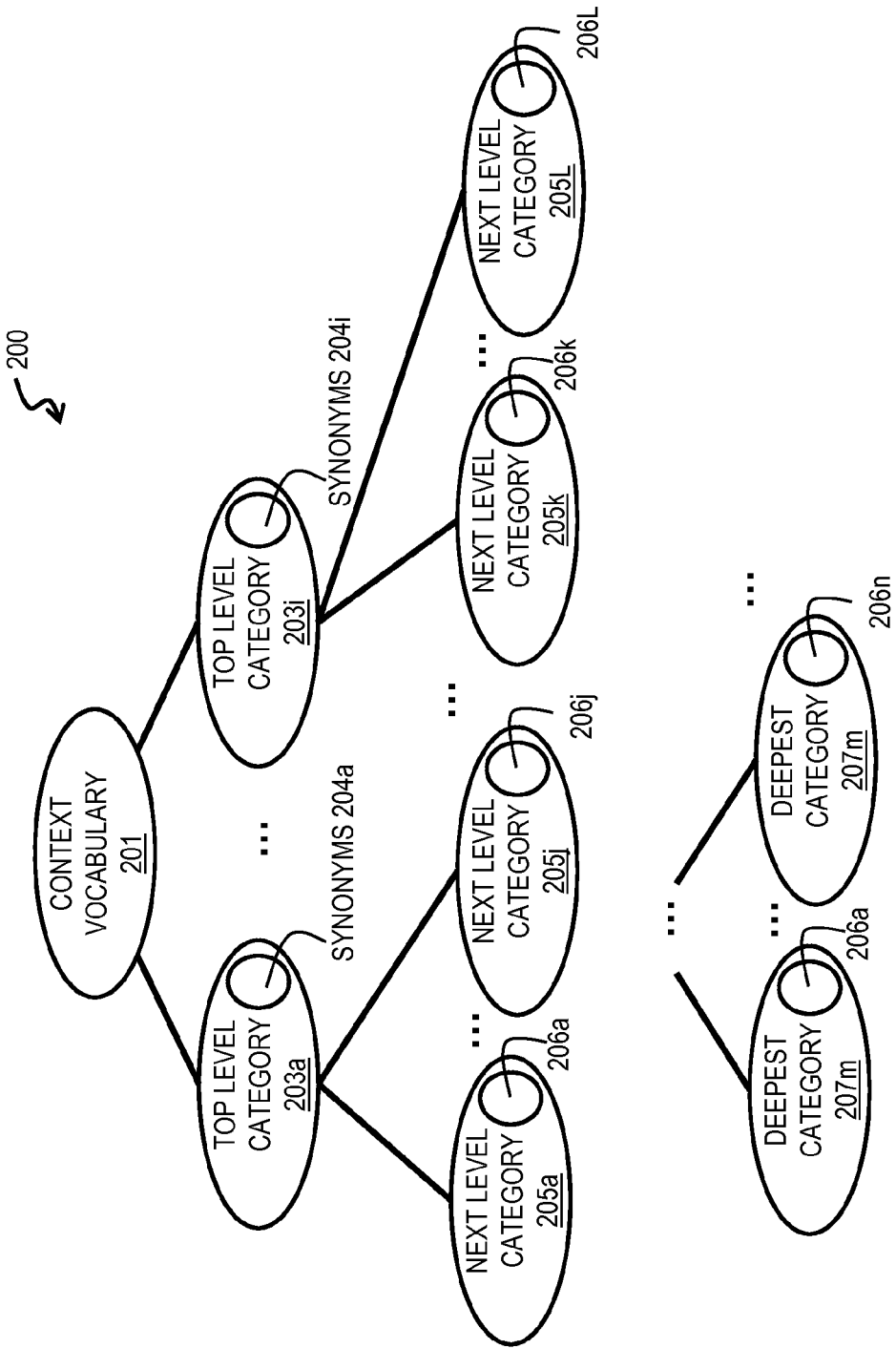
FIG. 2 is a diagram of an example topic topology, according to one embodiment.

FIG. 2 is a diagram of an example context topic topology, according to one embodiment. This context topic topology is a hierarchical topology that is compared to the topics and words used in one or more services the user subscribes to and candidate URLs relevant to those services and current context for a consumer. At the top or root level is the context vocabulary 201 as a whole derived from a set of contents describing consumer context. The context vocabulary is different from other vocabularies, e.g., the vocabularies of biology or literature or language semantics constructed from different sets of training documents. Below the root level are the top level categories 203a to 203i, which are top level of context topics, such as temporal contexts, spatial contexts, activity contexts, each encompassing one or more subtopics. Each topic is represented by a canonical name and zero or more synonyms, including the same name in different languages, such as synonyms 204a in top level category 203a and synonyms 204i in top level category 203i. One or more top level categories may be comprised of one or more next level categories 205a through 205j and 205k through 205L, each with their corresponding synonyms 206a, 206j, 206k and 206L, respectively. For example, temporal context subcategories include time of day, day of week, day of month, month, and season. Intervening levels, if any are indicated by ellipsis. At the deepest level represented by the deepest category 207a to 207m and corresponding synonyms 206a through 206m, respectively, are individual words or phrases such as Monday, o'clock, half past, quarter to, January, summer. Individual words can appear in multiple higher level categories, e.g., Monday appears in week and non-weekend categories.

In some embodiments, e.g., in embodiments based on LDA, there are only two levels of categories, e.g., topics and words, below the root level context vocabulary 201. Each topic is defined by a set of words, each with a particular range of occurrence percentages. In some of these embodiments, a vocabulary of V words is represented by a V-dimensional vector; and each word is represented by a V-dimensional vector with zeros in all positions but the position that corresponds to that particular word. Typically words of low meaning, such as articles, prepositions, pronouns and commonly used words are ignored, Each of T topics is represented by a V-dimensional vector with relative occurrences of each word in the topic represented by a percentage in the corresponding word positions. All topics are represented by a V×T matrix.

When a word from the context vocabulary is found in a document, that word is considered a mixture of the different topics that include that word, with a percent probability assigned to each topic based on the percentage of words in the document, for example using the well known methods of LDA. As a result, the entire document can be represented by a set of topics found in the document with a probability metric assigned to each topic, e.g., a T-dimensional vector with varying probabilities in each position of the vector. Such a vector is called a token herein. Two documents can be compared by computing a similarity of the two T-dimensional vectors (tokens) representing those documents, such as a sum of products of corresponding terms. Alternatively, or in addition, a distance metric can be computed between the two documents, which increases as the two tokens become less similar. Any distance metric can be used, such as an order zero distance (absolute value of the coordinate with the largest difference), an order 1 distance (a sum of the absolute values of the T differences,) an order two distance (a sum of the squares of the T differences—equivalent to the Euclidean distance), an order three distance (a sum of cubes of absolute values), etc. The more similar are tokens from two documents, or the smaller the distance between those tokens, the more relevant are the documents to each other. In the following description, it is assumed that a context vocabulary, e.g., as illustrated in FIG. 2, has been defined and is stored in a context vocabulary data structure. The context of a document or resource is represented by a context token. The more similar the context tokens of two documents, e.g., the smaller the distance measure between them, the more relevant one document is to the consumer context indicated by the other document. It is further assumed that there is a different, whole-language, semantic vocabulary for all topics of a language, such as is used in modern search engines.

FIG. 3 is a diagram 300 of the components of a context-indexed URL module 150, according to one embodiment. By way of example, the context-indexed URL module 150 includes one or more components for providing context-indexed network resource links. It is contemplated that the functions of these components may be combined in one or more components or performed by other components of equivalent functionality on the same or different network node. Each component or combination or portion thereof may be implemented in hardware or software or both, e.g. on chip set 800 described n FIG. 8 or a general purpose computer 700 described in FIG. 7.

The context-indexed URL module 150 interacts with one or more network services associated with consumers of the context-aware recommendation service 120, such as subscription service 310a, social network service 310b and navigation service 310n, among others indicated by ellipsis, collectively referenced hereinafter as consumer services 310. The context-indexed URL module 150 interacts with one or more URL search engines 113 well known in the art, such as internet URL search engines from GOOGLE™ of Mountain View, Calif. and YAHOO™ of Sunnyvale, Calif. The context-indexed URL module 150 also interacts with the context client 109 on UE 101, either directly, or indirectly through the context-aware recommendation service 120.

In the illustrated embodiment, the context-indexed URL module 150 includes a data sourcing manager (DSM) module 352, a service query manger (QM) module 354, a query data integrator (QDI) module 356, a context composition engine (CCE) module 358, a context vocabulary data structure 360, a context analyzer module 362, and a context-indexed URL repository data structure 370.

The data sourcing manager (DSM) module 352 controls the other depicted modules and acts as central controller for the module 150. The DSM module 352 determines sources of information relevant to consumer context, such as sources of spatial, temporal, environmental or activity information, like maps, calendars, weather services, or social networks, respectively. Each item relevant for consumer context is called a context feature, herein, or simply feature, for convenience. For example, the DSM performs a sweeping function for each section of a map from a mapping service, such as a map service of NAVTEQ™ of Chicago, Ill. or Lonely Planet within OVI maps 3.0 of NOKIA CORPORATION™ of Espoo, Finland. The DSM module 352 determines geographical coordinates for a map section and data indicating that points of interest are to be obtained in the map section associated with those geographical coordinates; and sends the coordinates and data indicating points of interest to the QM module 354. Similarly, the DSM module 352 performs a sweeping function for each date on a calendar associated with one or more consumers, such as a horoscope of astrological signs, astronomical calendar of moon phases and season changes, religious calendar of feast days for one or more religions, or social calendar of civic holidays. Similarly, the DSM module 352 performs a sweeping function of groups defined on one or more social networking sites, such as fans of a particular sporting team or celebrity or political movement. Thus, in various embodiments, the DSM module 352 is configured to determine a network service 310 that provides feature data that describes a context feature.

The query manager (QM) module 354 connects to known network resources 310 for consumers of the context-aware recommendation service 120, including map services and calendar services and social network services to obtain spatial, temporal, environmental and activity context information. The QM module 354 constructs a client request for information or a command for a published application programming interface (API) depending on the network resource being queried. The QM module 354 builds query structures or calls appropriate API sets based on the services being queried. The context-indexed URL module 150 is thus configured to cause, at least in part, actions that result in sending a query message to a network service.

For example, based on map section information sent by the DSM module 352, the QM module 354 builds a command for an API to a map backend process in the navigation service 310n. The map backend process of navigation service 310n returns data available within each queried section, such as POIs, POI categories, semantic descriptions, URLs if any, and exact geo-coordinates. Thus, in some embodiments, the feature data describes a point of interest in a mapping service; and the network service that provides the feature data that describes the context feature is a network mapping service.

Similarly, based on a social networking service and group identified by the DSM module 352, the QM module 354 builds an HTTP request for a social networking service 310b. The social networking service 310b returns data available within the group, such as posts, semantic descriptions, and URLs if any. In this embodiment, the network service that provides the feature data that describes the context feature is a social networking service.

Often, URL information is not provided by the source of context information, e.g., a website URL for a museum that is a POI is often not included in the data returned by the map backend process. When the QM module 354 does not receive a URL, but receives only certain information related to a location, then, in some embodiments, the QM module 354 queries other sources as well, such as alternative map services or social network sites with certain parameters obtained from one or more of the sources. Data obtained from each source is then passed to the query data integrator (QDI) module 356. Thus the QM module 354 is configured to receive feature data that describes the context feature in response to sending the query message to the network service.

The query data integrator (QDI) module 356 includes a set of rules that takes a single context feature as an integration point (for example geo-coordinates or time period or social networking group) and then integrates all data available with the feature into a single context feature data structure. Thus, in some embodiments, feature data describes a group of one or more items available from one or more services to which a consumer subscribes. The QDI integrator then passes the context feature data structure to the context composition engine (CCE) module 358. In some embodiments in which URL information is provided, the QM module 354 directly passes the URL through the QDI module 356 to context composition engine (CCE) module 358.

The context composition engine (CCE) module 358 parses the context feature data structure to determine whether the URL is present. Thus, in response to receiving feature data that describes a context feature, the CCE module 358 determines a network resource that is associated with the feature data. If the URL is present, the CCE module 358 determines whether one or more context tokens are included. A context token indicates a probability of each of one or more topics from the context vocabulary. If context tokens are missing, the CCE module 358 uses descriptions from the context feature data structure to determine the distributions of probabilities in those descriptions of topics from the context vocabulary data structure 360. Furthermore, the CCE module 358 sends descriptions from the context feature data structure or the resource indicated by the URL, or both, to the content analyzer module 362 to determine the distributions of probabilities in those descriptions of topics from the semantic vocabulary data structure 362. The content analyzer module 362 returns one semantic token to the CCE module 358 for each description. Thus, the CCE module 358 determines a feature context token that indicates a probability of a topic from the context vocabulary in the feature data; and determines resource and feature semantic tokens that each indicates a probability of a topic from the semantic vocabulary. The CCE module 358 fills the context feature data structure, as a kind of pre-defined context template, with the feature and URL information including context tokens and semantic tokens. If all the fields of the template are filled, the CCE module 358 then passes the filled template (e.g., feature record 470 described below) to context-indexed URL repository 370 for storage and later retrieval by the context-aware recommendation service 120.

If the URL information is missing, then the CCE module 358 identifies any network resources related to the available information by utilizing open APIs for searching provided by popular internet URL search engines, such as internet search engine 113. Therefore, the CCE module 358 causes, at least in part, actions that result in sending to a network resource search engine a topic from the context vocabulary based on the feature context token for the feature. Thus, in response to receiving first data that describes a context feature, the CCE module 358 determines a network resource that is associated with the first data. One or more of the URLs with the highest match scores are taken as candidates to be added to the appropriate field of the template. Thus, the CCE module 358 determines the network resource (e.g., URL) for a feature based on data returned from the network resource search engine. The resources indicated by these candidate URLs and descriptions in the context feature data structure are passed by the CCE module 358 to the content analyzer module 362.

The content analyzer module 362 parses the content (e.g., of a fetched web page), extracts the tags and then performs semantic matching to a pre-defined internal vocabulary (e.g., a semantic vocabulary 364 different from context vocabulary 360) and provides a semantic token that identifies the topics and probabilities for the content. Thus, the content analyzer determines semantic tokens for the feature data structure and each candidate URL based on the content vocabulary 364, and passes these tokens back to the CCE module 358. By using the content analyzer module 362 to determine the semantic tokens for candidate URLs, the CCE module 358 determines a semantic token that indicates a probability of a topic from a semantic vocabulary in the network resource.

The CCE module 358 then fills in missing semantic tokens in the template based on the semantic tokens for the feature data structure and URLs. The CCE module 358 determines one of the candidate URLs, if there are more than one, based on similarity of the semantic token of the candidate URL to the feature semantic token of the feature. In some embodiments, the degree of similarity is characterized as a relationship parameter (e.g. with values indicating substantively exact, nearby, or distant) or a distance metric, or both, and the relationship data is included in the filled in template. The CCE module 358 stores the filled in template (e.g., as feature record 470 described below) in the context-indexed URL repository 370 for later retrieval. Thus, the CCE module 358 causes, at least in part, actions that result in storing data that indicates the network resource in association with the context token. In some embodiments, the CCE module 358 determines a resource semantic token that indicates a probability of a topic from the semantic vocabulary in a candidate network resource and a feature semantic token that indicates a probability of a topic from the semantic vocabulary in a feature description. In some embodiments, the CCE module 358 then determines a distance metric based on the feature semantic token in the feature data and the resource semantic token for the candidate network resource. In some of these embodiments, the candidate network resource is selected as the network resource associated with the first data if the distance metric is less than a threshold.

Context data from context client 109 is passed to the DSM module 352, either directly, or indirectly through the context-aware recommendation service 120. The DSM module 352 determines if the current context of a consumer matches any of the contexts in the context-indexed URL repository. If so, then a URL in a matching record is pushed as a recommendation to the context client 109 or browser on the same UE 101. Thus the module 352 of the service 120 is further configured to receive a message that includes data that indicates a context for a particular consumer and to determine whether the context for the particular consumer is close to a context token associated with the network resource. The network data (e.g., URL) identifying the network resource is transmitted, if it is determined that the context for the consumer is close to the context token associated with the network resource (e.g., the URL).

In some embodiments, a URL is pushed only if the context token is less than a threshold distance from the client context. Thus, in some embodiments, determining whether the context for the particular consumer is close to the context token associated with the network resource further comprises determining that the context for the particular consumer is closer than a threshold value to the resource context tokens associated with the network resource. In some embodiments, only the closest one URL is pushed to the context client. In such embodiments, determining whether the context for the particular consumer is close to the context token associated with the network resource further comprises determining that the context for the particular consumer is closer to the context token associated with the network resource than to a context token associated with any other network resource.

The operation of the components of FIG. 3 is illustrated with an example mapping embodiment. FIG. 4A is a diagram of a roadmap tile 400 with points of interest 412, according to an embodiment. The roadmap tile 400 includes rows of picture elements (pixels) arranged in a horizontal dimension 402 and columns of pixels arranged in a vertical dimension 404. The pixels represent map information, such as landform 410 (e.g., a lake or park), and one or more points of interest 412a and 412b, collectively referenced hereinafter as pointes of interest 412, such as a bank or theater. The tile 400 also includes pixels representing road segment 420a, road segment 420b, road segment 420c and road segment 420d, among others, collectively called road segments 420 hereinafter. For purposes of illustration, it is assumed that this tile is identified within a two dimensional array of map tiles by a horizontal index and a vertical index and a zoom level value. Data associated with the landform 410, points of interest 412, and road segments 420 are maintained by a map backend process for the navigation service 310n. For purposes of illustration, it is assumed that a published API is available for retrieving the data associated with the map tiles from the map backend process.

Figure 4C:
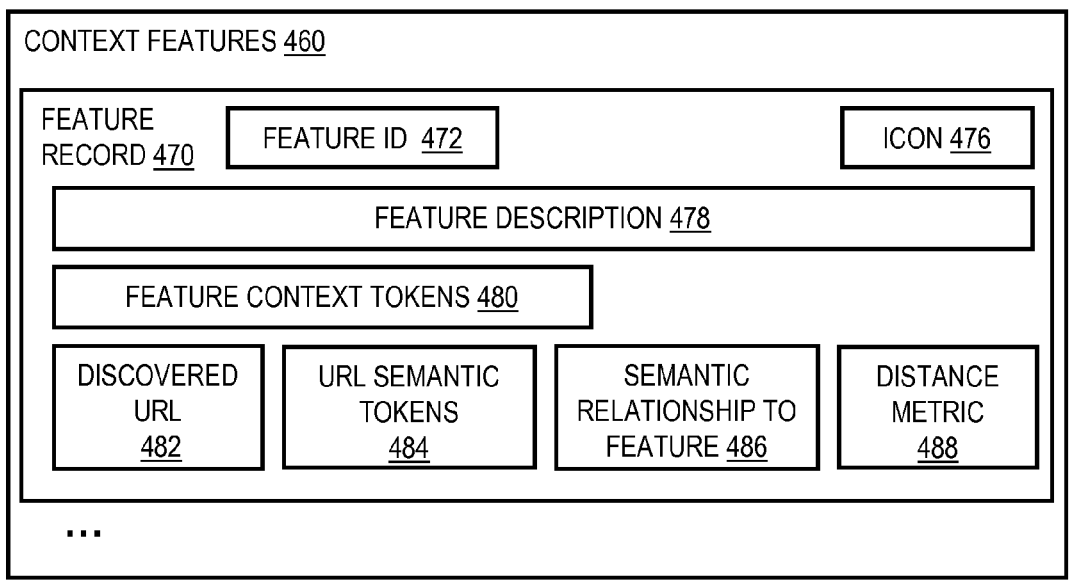
FIG. 4C is a diagram of a context features data structure with context-indexed URL information, according to an embodiment.

When the context-indexed URL module 150 requests POI data from the map backend process and then associates that POI data with context topics and a URL, the combined information is stored in a POI data structure within the context-indexed URL repository 370. FIG. 4B is a diagram of a points of interest data structure 430 with context-indexed URL information, according to an embodiment. Although data structures and fields therein are depicted in FIG. 4B, and subsequent diagram of FIG. 4C, as integral blocks in a particular order for purposes of illustration, in other embodiments, one or more fields or portions thereof are stored in one or more data structures such as databases on one or more nodes on a network, such as network 105, or one or more fields or portions thereof are omitted, or one or more fields are added, or the data structure is changed in some combination of ways.

In the illustrated embodiment, the points of interest data structure 430 includes a point of interest (POI) record 440 for each point of interest retrieved from a mapping service, such as a map backend process of navigation service 110n or navigation service 310n. POI records 440 for other points of interest are indicated by ellipsis.

The POI record 440 is one example of a context feature data structure for a single feature, e.g., a particular POI. The POI record 440 includes a POI identifier (ID) field, a geolocation field 444, an icon field 446, a description field 448, a POI context tokens field 450, a discovered URL field 452, a URL semantic tokens field 454, a content relationship field 456 and a distance metric field 458.

The POI ID field 442 includes data that uniquely indicates the POI among all sources of points of interest. For example, the POI ID field holds data that indicates a mapping process from which the POI was derived and the unique POI identifier in that mapping process.

The geolocation field 444 holds data that indicates the geolocation of the point of interest, e.g., latitude and longitude coordinates and, in some embodiments, a vertical or radial coordinate such as altitude or distance from Earth's center. The icon field 446 holds data that indicates a set of one or more pixels used to present a symbol representing the point of interest on a display device, such as a pointer to a file that contains an image of a bank symbol.

The description field 448 holds data that describes the point of interest, such as text that indicates a name for the point of interest and text that indicates one or more of a category (e.g., bank, museum, restaurant, airport etc.), a postal address, an owner's name, an owner's address, a description of activities that occur there, one or more associated URLs, if any, and any other information provided by the mapping backend process in response to a query.

The POI context tokens field 450 holds data that indicates context tokens, if any, derived from data in the description field 448 and zero or more of fields 442, 444 and 446.

The discovered URL field 452 holds data that indicates a network address of a network resource, such as the URL of that resource. If one URL is included in the description field 448, then, in some embodiments data indicating that URL is moved to or repeated in field 452. If multiple URLs are included in the description field 448, then data indicating one of those URLs is moved to or repeated in field 452. One URL of many may be selected for field 452 in any manner known in the art, such as always the first URL that appears in description field 448, always the URL of any other order, such as the last or middle of an odd number, or at random. In some embodiments, data is retrieved from each resource of the multiple resources indicated by the multiple URLs, and a semantic token of each is determined in the content analyzer module 362, and the one URL that has a semantic token that most closely matches a semantic token for the feature is selected for field 452. In some embodiments, if no URL appears in description field 448, then a URL search engine 113 is queried with text derived from topics indicated by one or more context tokens in the POI context tokens field 450; and one of the URLs returned is determined for the discovered URL field 452, using any of the methods described above for multiple URLs in description field 448.

The URL semantic tokens field 454 holds data that indicates one or more semantic tokens derived from the resource indicated by the URL indicated in field 452, as determined by the content analyzer module 362.

The context relationship to POI field 456 holds data that indicates the type of agreement between the semantic tokens for the feature and the semantic tokens in field 454, e.g., substantively exact, nearby, or distant. The content relationship to POI field 456 is an example means to achieve the advantage of determining rapidly whether a discovered URL is well matched to the POI and worth presenting to a user compared to other URLs associated with other POIs.

The distance metric field 458 holds data that indicates a distance between the POI semantic tokens and the URL semantic tokens in field 454. Again any measure of distance may be used, such as Euclidean distance between the closest token in the POI set to any token in the URL set, or some weighted function of the distances between several tokens in each set. Typically there is only one token in each set. The distance metric field 458 combined with the URL semantic tokens field 454 is an example means to achieve the advantage of replacing a distant URL found at one time with a closer URL found at a later time, so that the context-indexed URL repository 370 improves in context relevance over time.

In some embodiments, field 456 is used instead of fields 454 and 458. Omitting fields 454 and 458 is an example means of achieving the advantage of reducing the size of each POI record 440 and hence reducing the total memory or storage demands of the data structure 430 and repository 370, while still allowing a comparison of relative value of several URLs to a consumer's current context.

POI record 440 is an example means to provide the advantage of associating a URL with context features that can be related to a consumer's current context, such as the consumer's current location.

Similar data structures are employed for other types of context features. FIG. 4C is a diagram of a context features data structure 460 with context-indexed URL information, according to an embodiment. In some embodiments, context features data structure 460 includes points of interest data structure 430, with for example, the geolocation field included in feature ID field 472, described below. When the context-indexed URL module 150 requests a context feature from a backend process or a network service and then associates the returned data with context topics and a URL, the combined information is stored in a context features data structure 460 within the context-indexed URL repository 370.

In the illustrated embodiment, the context features data structure 460 includes a feature record 470 for each feature retrieved from a consumer service, such as a social networking service 310b. Feature records 470 for other features are indicated by ellipsis. The feature record 470 includes a feature identifier (ID) field 472, an icon field 476, a feature description field 478, a feature context tokens field 480, a discovered URL field 482, a URL semantic tokens field 484, a content relationship field 486 and a distance metric field 488. These fields are analogous to fields 442, 446, 448 450 452, 454, 456 and 458, respectively, described above The feature ID field 472 includes data that uniquely indicates the feature among all sources of features. For example, the feature ID field holds data that indicates a network service from which the feature was derived and the unique feature identifier in that service, such as a celebrity fan group in a social networking service for a particular celebrity. In some embodiments in which map POIs are included in the context features data structure 460, the geolocation field 444 is included in the feature ID field 472.

The icon field 476 holds data that indicates a set of one or more pixels used to present a symbol representing the feature on a display device, such as a pointer to a file that contains an image of the celebrity.

The description field 478 holds data that describes the feature, such as text that indicates a name for the group and text that indicates one or more posts published by the group, one or more associated URLs, if any, and any other information provided by the social networking service in response to a query directed to the group.

The feature context tokens field 480 holds data that indicates context tokens, if any, derived from data in the description field 478 and zero or more of fields 472 and 476.

The discovered URL field 482 holds data that indicates a network address of a network resource, such as the URL of that resource. If one URL is included in the description field 478, then, in some embodiments, data indicating that URL is moved to or repeated in field 482. If multiple URLs are included in the description field 478, then data indicating one of those URLs is moved to or repeated in field 482. One URL of many may be selected for field 482 in any manner known in the art, as described above. In some embodiments, if no URL appears in description field 478, then a URL search engine 113 is queried with text derived from topics indicated in the feature context tokens field 480; and one of the URLs returned is selected for the discovered URL field 482, using any of the methods described above for multiple URLs in description field 478.

The URL semantic tokens field 484 holds data that indicates one or more semantic tokens derived from the resource indicated by the URL indicated in field 482, as determined by the content analyzer module 362.

The content relationship to feature field 486 holds data that indicates the type of agreement between the semantic token for the feature and the semantic tokens in field 484, e.g., substantively exact, nearby, or distant. The content relationship to feature field 486 is an example means to achieve the advantage of determining rapidly whether a discovered URL is well matched to the feature, and thus worth presenting to a user compared to other URLs associated with other features.

The distance metric field 488 holds data that indicates a distance between the feature semantic tokens and the URL semantic tokens in field 484. Again any measure of distance may be used, as described above. The distance metric field 488 combined with the URL semantic tokens field 484 is an example means to achieve the advantage of replacing a distant URL found at one time with a closer URL found at a later time, so that the context-indexed URL repository 370 improves in context relevance over time.

In some embodiments, field 486 is used instead of fields 484 and 488. Omitting fields 484 and 488 is an example means of achieving the advantage of reducing the size of each feature record 470 and hence reducing the total memory or storage demands of the data structure 430 and repository 370, while still allowing a comparison of relative value of several URLs to a consumer's current context.

Feature record 470 is an example means to provide the advantage of associating a URL with context features that can be related to a consumer's current context, such as the consumer's current time or activity. For example, if the user's current activity includes viewing posts to a social networking group of fans of a particular celebrity, record 470 associates that social networking group with a URL of the celebrity's website.

Figure 5:
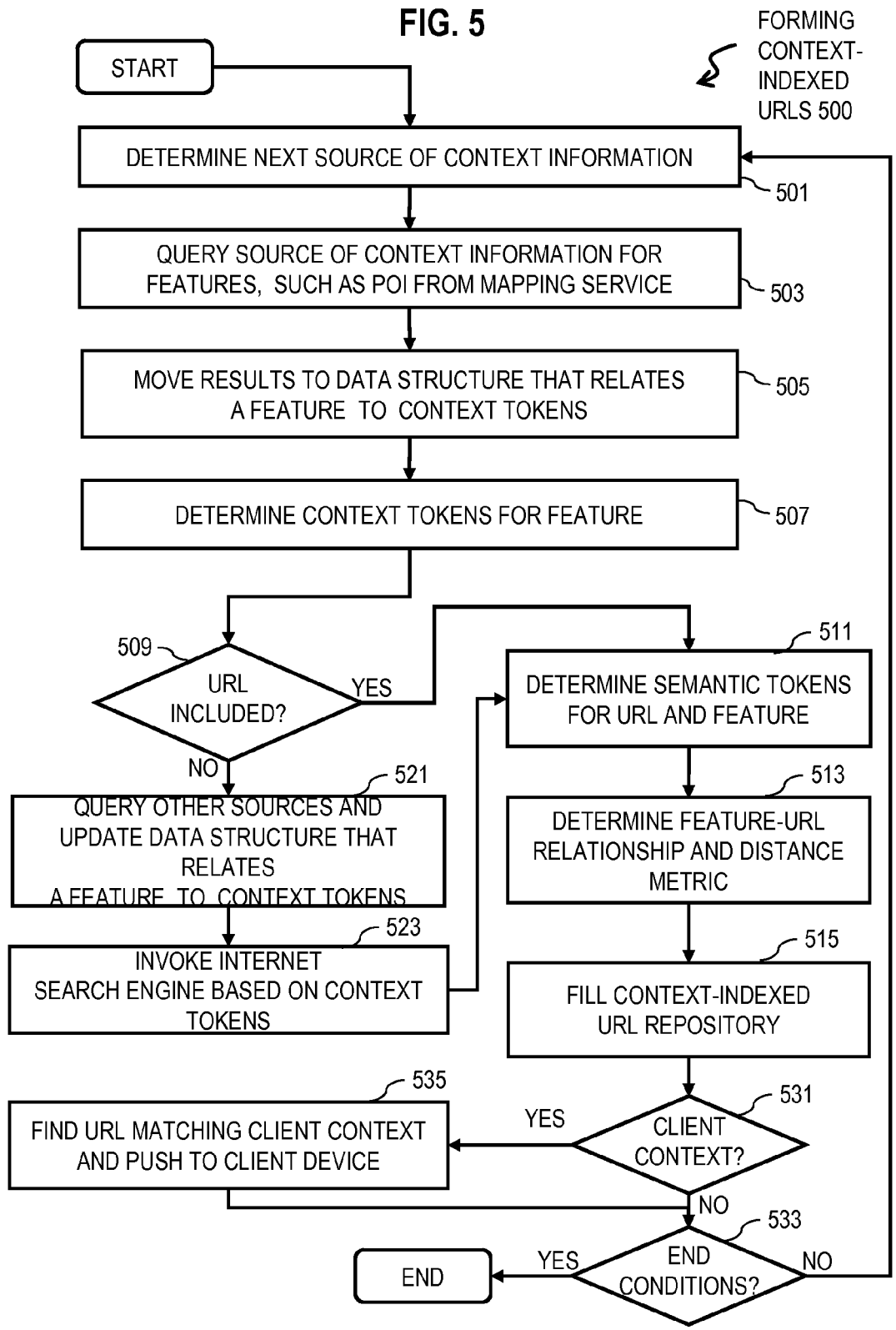
FIG. 5 is a flowchart of a process at a service for providing context-indexed network resources, according to one embodiment.

FIG. 5 is a flowchart of a process 500 at a service for providing context-indexed network resources, according to one embodiment. Although processes are depicted in FIG. 5, and subsequent flowchart FIG. 6, as integral steps in a particular order for purposes of illustration, in other embodiments one or more steps, or portions thereof, are performed in a different order or overlapping in time, in series or parallel, or one or more steps or portions thereof are omitted, or other steps are added, or the process is changed in some combination of ways. In one embodiment, the context-indexed URL module 150 performs the process 500 and is implemented in, for instance, a chip set including a processor and a memory as shown FIG. 8 or a general purpose computer as depicted in FIG. 7.

In step 501, the next source of context information is determined. In the illustrated embodiment, the next source is determined by the DSM module 352. Any method may be used to determine the next source, e.g., by a priori selection of one or more network services 110 or 310, such as network services available from the same vendor that provides the context-aware recommendation service 120, including one or more mapping services and social networking services. For example, the next map tile in the NAVTEQ backend map process is identified as a source of spatial context information. In some embodiments, a context client 109 monitors the messages and activities of consumers of the context-aware recommendation service 120; and reports those activities and messages to the DSM module 352. The DSM module 352 determines what context features are involved with such activities (such as map points of interest, calendar events, social networking groups), and determining whether a URL is associated in the context-indexed URL repository 370 with such context features, such as points of interest from the map tile currently requested by the consumer. If not, then the network service associated with the messages or activities is identified as a source of context information, e.g., the messaging service or social networking service or mapping service with which the consumer is currently communicating.

In step 503, the next source of context information is queried for one or more context features, such as POIs from the next tile of a mapping process. In the illustrated embodiment, the DSM module 352 sends the information for the query, such as the map service and tile identifier or social networking service and group, to the service query manager (QM) module 354. The QM module 354 determines the format for the query and sends the query to the source of the context information. For example, the QM module 354 determines the proper command to the published API of the source, e.g., the NAVTEQ mapping backend process, and sends that command. In some embodiments, the QM module 354 maintains a data structure with templates of queries for various sources and fills in those templates with information sent by the DSM module 352, then issues the query. Results are received back from the source by the QM module 354, e.g., the points of interest in the map tile or the latest posts to a social networking group, are returned in one or more messages sent over the network 105.

In step 505, data from the results received in step 505 are moved into a data structure that relates the feature to context tokens. In the illustrated embodiment the query data integrator (QDI) module 356 performs step 507 with results passed from the QM module 354. For example, data is moved to feature record data structure 470. The feature identifier, e.g., the source network service or API and the social network group identifier at that source, is placed in the feature ID field 472. If the feature is a map POI, the geo-coordinates are placed in the geolocation field 444, e.g., in the feature ID field 472. An icon for the feature, if available, is placed in icon field 476. The description of the feature provided in the results is placed in feature description field 478. If one or more context tokens are included in the results, those are moved to the feature context tokens field.

In step 507, the feature context token for the feature are determined. In the illustrated embodiment, step 507 and following steps 509, 511, 513, 515, 521 and 523 are performed or controlled by the context composition engine (CCE) 358. To simplify the description, reference will be made to fields in the feature record 470; but it is understood that if the feature is a map POI, the corresponding fields in POI record 440 are also indicated.

Step 507 includes determining whether one or more context tokens already appear in the feature context tokens field 480. If so, then no further action is taken in step 507. If not, then the description in field 478, appended to the description in feature ID field 472 or icon field 476 in some embodiments (or the geolocation field 444 in some POI embodiments), is used with context vocabulary 360 to determine the context token indicated by the compilation of these fields, e.g., using the well known methods of LDA or pLSI. The feature context token is placed in feature context tokens field 480. In some embodiments, different portions of the compilation are used separately; and each produces a different context token, all of which are stored in field 480.

In step 509 it is determined whether a URL is included in the feature description field 478. If so, then control passes to step 511 to determine a resource semantic token for the URL. In some embodiments, multiple URLs are included in the description field 478 and considered in step 511. In some embodiments considering multiple candidate URLs, the semantic token for each URL is determined, by sending the content of the resource indicated by the candidate URL to the content analyzer module 362 which returns a candidate resource semantic token. The URL with a resource semantic token most similar to a semantic token for the feature description is determined to be the best URL. Data indicating the best URL is placed in the discovered URL field 482 of the feature record 470. Data indicating the resource semantic token of the best URL is placed in the URL semantic tokens field 484 of the feature record 470.

In some embodiments, similarity is determined between two sets, at least one of which has multiple context tokens. Any method may be used to determine the similarity between the set of context tokens of a URL (called the URL set) and the set of context tokens of the feature (called the feature set). For example, in some embodiments, a distance or similarity is determined between the context token of the feature set with the most probable topic and the context token of the URL set that is closest. In some embodiments, a distance or similarity is determined between the context token of the feature set with the most probable topic and the context token of the URL set that is has the most probable topic. In some embodiments, a weighted sum of the distance or similarities of multiple pairs of context tokens is determined, each pair having one context token from the feature set and one context token from the URL set. The pairs can be formed using any method, such as most probable remaining context token of the feature set paired with the most probable remaining context token of the URL set, or most probable remaining context token of the feature set paired with the closest remaining context token of the URL set.

In step 513 the distance between the feature context token and the resource context token for the best URL is determined. In some embodiments, data indicating this distance is placed in the distance metric field 488 of the feature record 470. In some embodiments, a relationship is determined based on the size of the distance computed. For example, if the distance is less than a first threshold, then the resource indicated by the URL is said to have a relationship to the feature that is "substantively exact." If the distance is greater than the first threshold but less than a second threshold, then the resource indicated by the URL is said to have a relationship to the feature that is "close." If the distance is greater than the second threshold, then the resource indicated by the URL is said to have a relationship to the feature that is "distant." In these embodiments, data indicating the relationship is placed in the context relationship to feature field 486.

In step 515 the feature record 470, with all fields filled, is placed in the context-indexed URL repository data structure 370, such as a database.

If it is determined, in step 509, that no URL is included in the feature description field 478, then in step 521 other sources are queried to obtain more information about the feature and the feature description is updated with additional information. For example, the QM module 354 queries other sources associated with the consumers of the context-aware recommendation service 120 with certain parameters obtained from one or more previous sources for the feature, such as the POI or social networking group. Data obtained from each source is then passed to the QDI module 356 which updates the feature ID field 472 or icon field 476 or feature description field 480, or some combination. The QDI module 356 then passes the updated feature record 470 to the CCE module to perform step 523.

In step 523, context vocabulary words associated with one or more topics in one or more corresponding tokens associated with the feature are submitted to a URL search engine 113, such as GOOGLE or YAHOO. For example, the CCE module 358 constructs a text string based on words associated with the most probable topics in the feature context token in field 480; and submits the text string to the URL search engine 113. As a result, one or more URLs are returned, e.g., to the CCE module 358. In some embodiments the most relevant URL, e.g., the first URL returned by the search engine 113, is passed to step 511 and following to determine the resource context token for the URL and distance or relationship, or both. In some embodiments several of the most relevant URLs, e.g., the first five URLs returned by the search engine 113, are passed to step 511 and following to determine the context tokens for the URLs, the best URL, and distance or relationship, or both, of the best URL to the feature. Use of standard URL search engine 113 is an example means of obtaining the advantage of avoiding the bandwidth and cost consumption of monitoring all network resources for context information.

In step 531, it is determined whether a context client process on user equipment (e.g., UE 101) of a consumer has sent a message indicating the current context of the consumer. For example, an extended markup language (XML) message is received from context client 109 indicating one or more context parameters and values, such as geolocation of UE 101, time of interest to consumer, current channel of sources of interest, current activities culled from one or more messages sent or received by the consumer, applications currently running on the UE 101, current category of user activities (e.g., work, home, vacation, dining, etc.), among others. If not, control passes to step 533 to determine whether conditions are satisfied for ending the process. If so the process ends; otherwise the process continues at step 501 to mine another source for context information. If a message indicating the current context of the consumer is received in sep 531, then control passes to step 535.

In step 535, the context values are matched to one or more context topics, e.g. by determining a consumer context token for the contents of the message received in step 531 by using the content analyzer module 362. This consumer context token is compared to the context tokens in the feature context tokens field 480 of several records to find one or more features relevant to the consumer's current context. For example, a feature is relevant if the distance between the consumer context token and the feature context token is less than a threshold distance. The URLs in the discovered URL field 482 of the most relevant feature records 440 are then pushed to the UE 101 for presentation to a consumer, e.g., in one or more HTTP messages to browser 107 or one or more messages to context client 109 for presentation via the UI module 108. Thus context relevant URLs are recommended to the consumer.

In some embodiments, step 531 and step 533 are performed by the context-aware recommendation service 120. In some embodiments, one or both steps are performed by the DSM module 352 of the context-indexed URL module 150.

Figure 6:
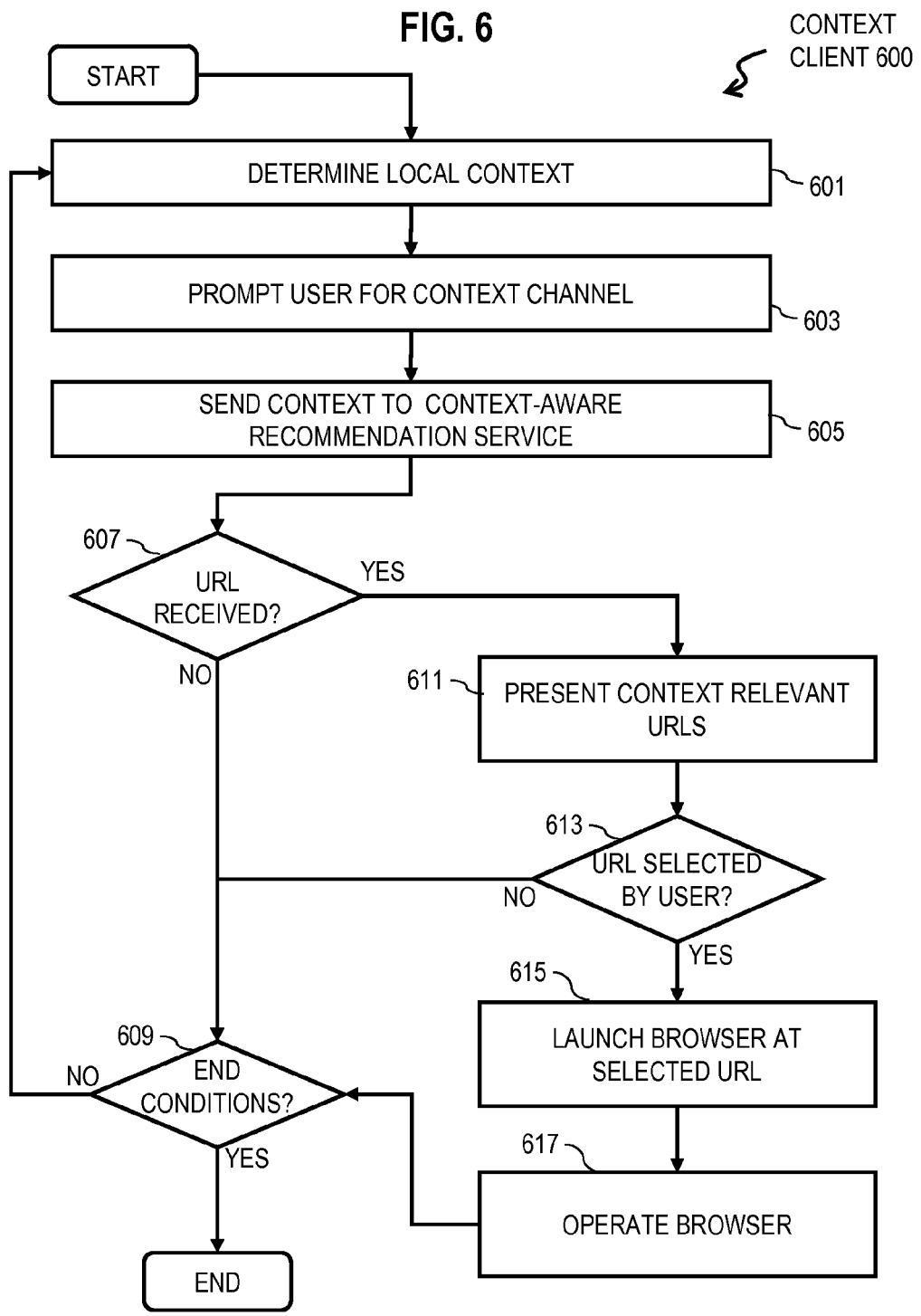
FIG. 6 is a flowchart of a process on consumer equipment for providing context-indexed network resources, according to one embodiment.
Figure 7:
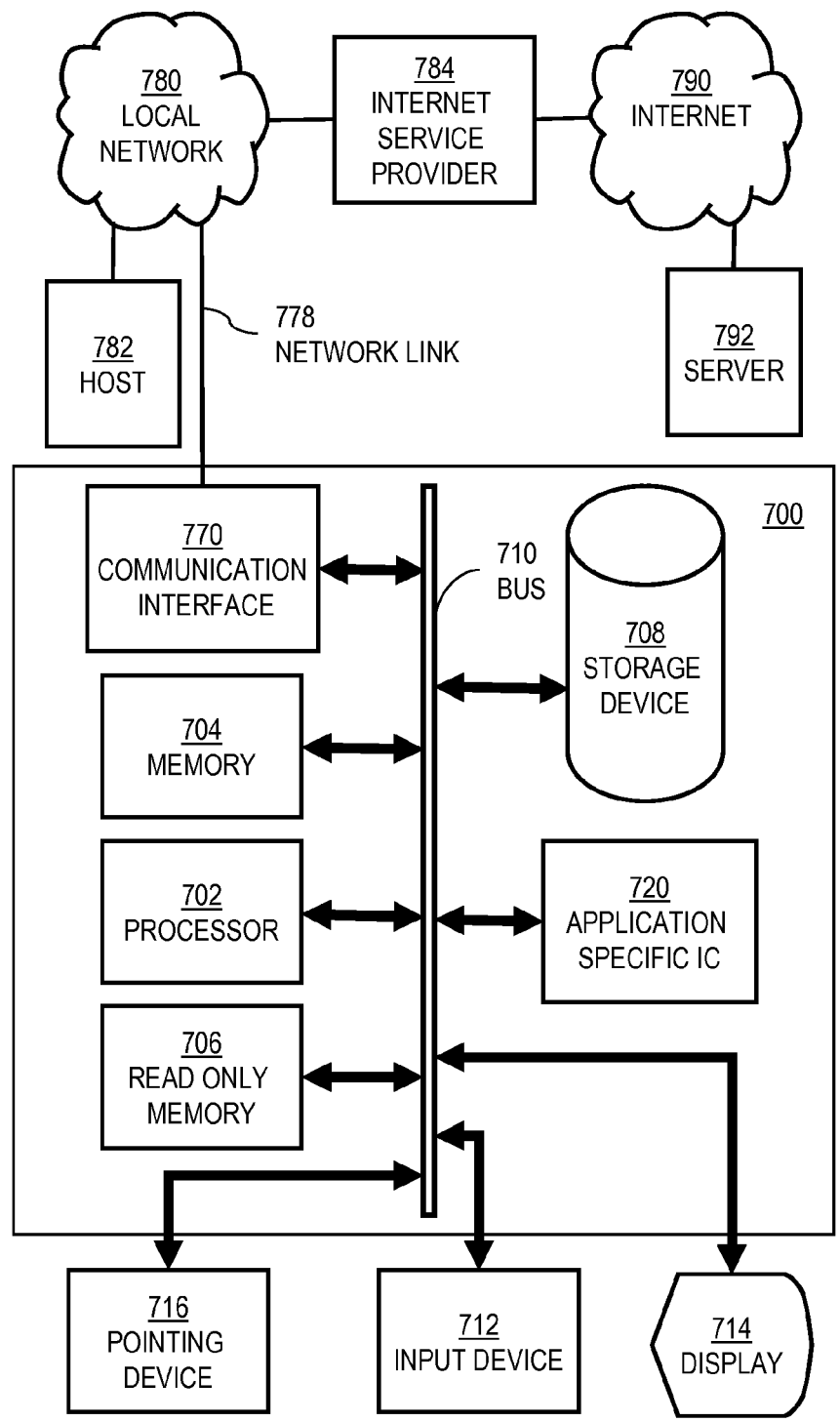
FIG. 7 is a diagram of hardware that can be used to implement an embodiment of the invention.

FIG. 6 is a flowchart of a process on consumer equipment for providing context-indexed network resources, according to one embodiment. In some embodiments, context client 109 performs the process 600 and is implemented in, for instance, a chip set including a processor and a memory as shown FIG. 8 or a mobile terminal as depicted in FIG. 9.

In step 601, local context on UE 101 is determined. Any method may be used to determine local context. For example, current location of UE 101 is determined based on output from the positioning system module 103. Current time and executing applications on UE 101 are determined by one or more queries to an operating system on UE 101, as is well known in the art. In some embodiments, one or more data sources (such as a social networking service or messaging service) and activities (such as work, home, vacation, dining, shopping) are determined by monitoring messages sent by and received at the UE 101, as is well known in the art.

In step 603 a user is prompted for a context channel. For example, the UI 108 presents one or more context channels on a display screen with active areas to indicate when the user has selected one of the context channels. Each context channel is associated with types of sources or activities of interest to the user at the current time, such as socializing, music listening, video watching, news reading, trip planning, among others.

Thus in step 601 or step 603, or both, the context client 109 determines local context data that indicates one or more of temporal, spatial, environmental or activity circumstances of a consumer of network services.

In step 605, the context of the consumer is sent to the context-aware recommendation service 120, e.g., in one or more messages including XML payloads. The XML payload indicates the context parameters and values that describe the consumer's current context. Thus, the context client causes, at least in part, actions that result in sending the local context data to a service 120 via a network 105.

In step 607, it is determined whether one or more URLs are received from the context-aware recommendation service 120, or a component thereof, such as the DSM module 352. If not, then in step 609, it is determined whether end conditions are satisfied, e.g., powering down the UE 101. If so, then the process ends; otherwise, control passes back to step 601 to update the local context. Either the context client 109 or the browser 107 may receive the URLs. Thus the context client or browser on the UE 101 determines whether data that indicates a network resource is received in response to sending the local context data.

If it is determined in step 607 that one or more URLs are received from the context-aware recommendation service 120, or a component thereof, then in step 611 the one or more URLs are presented to a user for selection. In some embodiments, the URLs are presented by the UI module 108 in the same UI used to determine the context channel selected by the consumer. In some embodiments, one or more of the URLs are presented in a web page displayed by a browser 107. Thus, if a URL that indicates the network resource is received, then the client 109 or browser 107 causes, at least in part, actions that result in presenting data that indicates the network resource to the consumer.

In step 613, it is determined whether a consumer has selected a URL, e.g, using a pointing device, such as a touchscreen or cursor and control keys. If not, then control passes to step 609 to determine whether end conditions are satisfied, as described above.

If it is determined, in step 613, that a consumer has selected a URL, then in step 615 the browser requests and displays the web page from the URL. If the browser is not executing when the URL is selected, e.g., the URL is presented by the UI module 108 of the context client 109, then step 615 includes launching the browser 107 and then requesting and displaying the web page from the URL. Thus, in some embodiments, the context client 109 launches a browser 107 to access the network resource, if it is determined that the consumer has selected the data that indicates the network resource in response to presenting the data that indicates the network resource to the consumer.

In step 617 the browser is operated based on user input, e.g., the consumer interacts with one or more items or links on the web page provided by the URL. Control then flows to step 609 to determine if end conditions are satisfied, as described above.

An advantage of system 100 is that external service providers are not required to enter their own URLs and provide context data related to their content. This saves processor and memory usage by operators on the operators' equipment. Instead, the context-indexed URL module 150 obtains data directly from maps and other sources associated with consumers. Storage on the apparatus hosting the context-indexed URL module is conserved because there is no need to have a separate tool for content providers. Costs are saved because separate tools do not need to be developed for each network resource; and there are no solicitation costs to obtain context data from providers of network resources. Network bandwidth is conserved that would otherwise be consumed in sending and responding to such solicitations, and monitoring content of all network resources. Time to market is significantly improved by possibly years as there is already data available for the context-aware recommendation service 120 by focusing on a subset of services, which are employed by consumers of the context-aware recommendation service. The comprehensive monitoring of the advertiser-supported, free URL search engine 113 is leveraged to identify other network resources outside the focus subset. Because the system 100 is automated, there is less manual intervention, and improved management and service infrastructure. The modularized framework depicted in FIG. 3 is an example means to achieve the advantage of allowing new sources of data to be added simply when available—a corresponding query stack is added to the QM module 354 without affecting the operation of the other modules 352, 356, 358, 3622 or data structures 360 and 370.

The processes described herein for providing context-indexed network resources may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide context-indexed network resources as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing context-indexed network resources.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing context-indexed network resources. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing context-indexed network resources. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing context-indexed network resources, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing context-indexed network resources to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
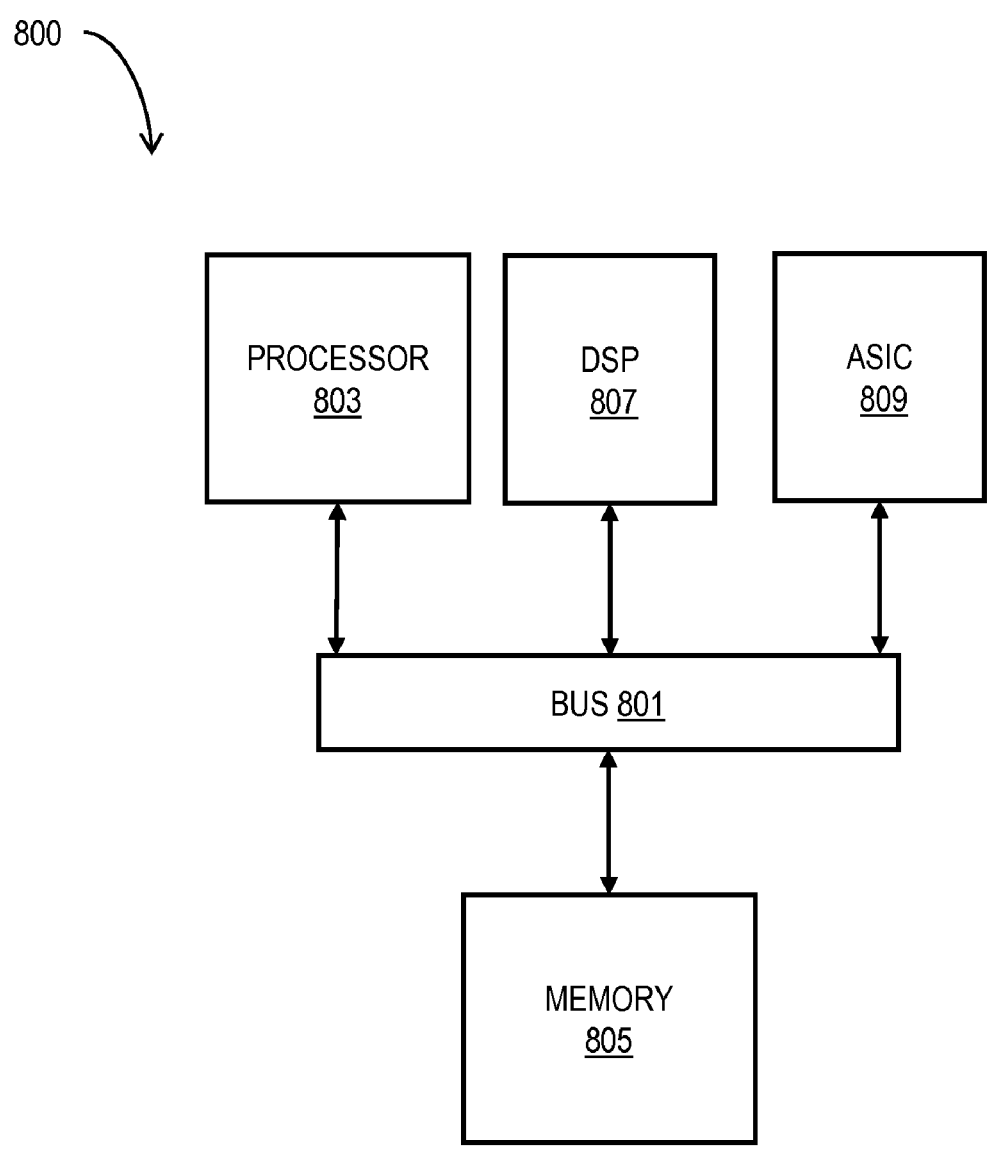
FIG. 8 is a diagram of a chip set that can be used to implement an embodiment of the invention.

FIG. 8 illustrates a chip set or chip 800 upon which an embodiment of the invention may be implemented. Chip set 800 is programmed to provide context-indexed network resources as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of providing context-indexed network resources.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide context-indexed network resources. The memory 805 also stores the data associated with or generated by the execution of the inventive steps.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps to provide context-indexed network resources. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing context-indexed network resources. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide context-indexed network resources. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus comprising:
   at least one processor; and
   at least one memory including computer program code,
   the at least one memory and the computer program code configured to, with the at least one processor, cause the apparatus to perform at least the following,
   determine local context data that indicates one or more of temporal, spatial, environmental or activity circumstances of a consumer who uses the apparatus to obtain network services;
   cause, at least in part, transmission of the local context data to a service via a network;
   determine whether data that indicates a network resource is received in response to the transmission of the local context data; and
   if the data that indicates the network resource is received in response to the transmission of the local context data, then cause, at least in part, presentation of data that indicates the network resource on a display of the apparatus,
   wherein the apparatus is a user device.

2. An apparatus of claim 1, wherein the apparatus is further caused, at least in part, to launch a browser to access the network resource, if it is determined that the data that indicates the network resource has been selected in response to the presentation of the data that indicates the network resource.

3. An apparatus of claim 1, wherein the apparatus is a mobile phone further comprising:
- user interface circuitry and user interface software configured to facilitate user control of at least some functions of the mobile phone through use of a display and configured to respond to user input; and
- a display and display circuitry configured to display at least a portion of a user interface of the mobile phone, the display and display circuitry configured to facilitate user control of at least some functions of the mobile phone.

4. An apparatus of claim 1, wherein the local context data indicates one or more of spatial, environmental or activity circumstances of the consumer.

5. An apparatus of claim 1, wherein the local context data indicates a point of interest in a mapping application, an entry in calendar application, a social network contact, or a combination thereof.

6. An apparatus of claim 1, wherein the apparatus is further caused to:
- cause, at least in part, transmission of a query message to one of the network services; and
- receive the local context data in response to the transmission of the query message to the one of the network services.

7. An apparatus of claim 6, wherein the one of the network services includes a network mapping service, a social networking service, or a combination thereof.

* * * * *